C. A. JENKINS.
Thrashing Machine.

No. 231,806.  Patented Aug. 31, 1880.

Attest:
Geo. T. Smallwood Jr.
Walter Allen

Inventor:
Charles A. Jenkins
By M. F. Jeffries, Atty.

UNITED STATES PATENT OFFICE.

CHARLES A. JENKINS, OF SACRAMENTO, CALIFORNIA.

THRASHING-MACHINE.

SPECIFICATION forming part of Letters Patent No. 231,806, dated August 31, 1880.

Application filed February 24, 1880.

*To all whom it may concern:*

Be it known that I, CHARLES A. JENKINS, of the city and county of Sacramento, State of California, have invented an Improvement in Thrashing-Machines; and I hereby declare the following to be a full, clear, and exact description thereof.

My invention consists in the combination, as hereinafter described, of successive thrashing-cylinders, an interposed overfeed, a final over-concave, and a slatted sheet-iron bottom of peculiar construction, substantially as hereinafter set forth.

Figure 1:
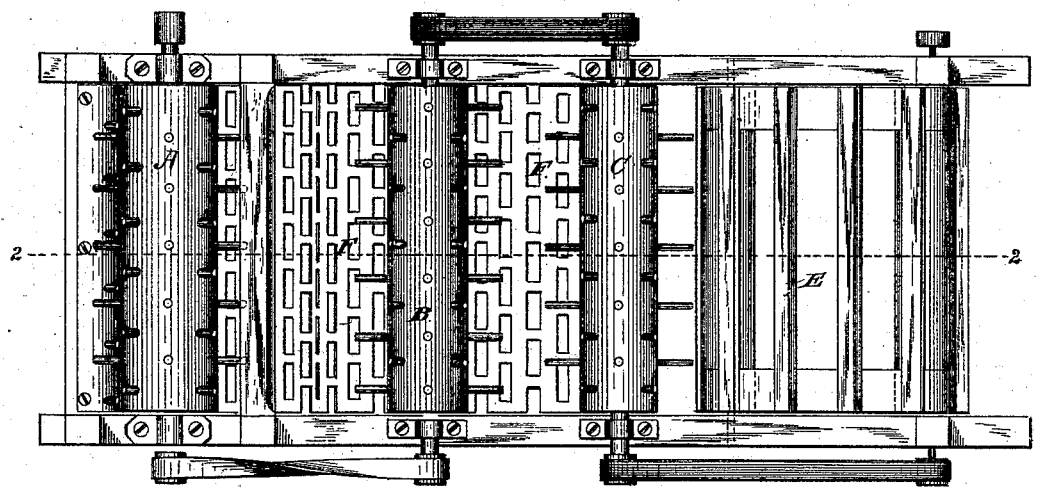
Figure 2:
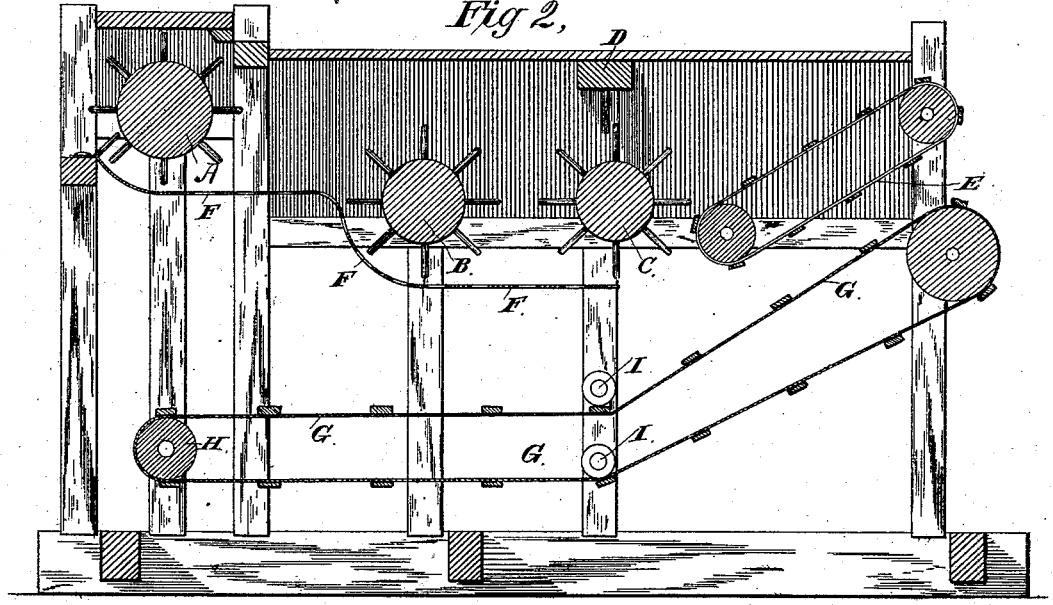

In the drawings, Figure 1 is a top view of that portion of the thrashing-machine containing the cylinders and self-feeder. Fig. 2 is a vertical longitudinal section on the line 2 2, Fig. 1.

In the operation of thrashing grain from the straw when but one cylinder is used, or when two are used without an intervening space, the grain will be partially beaten from its husk and the grain and straw will be delivered together upon the grain-draper, from the upper end of which the straw is discharged, while the grain and chaff pass to the cleaning apparatus. Such machines, when not fed beyond their capacity, do not cause the loss of much grain unless the straw be very long or damp; but when they are run at a high rate of speed, or the feed is forced, the loss of grain is greater than the entire cost of thrashing. This is owing to the grain being held in suspension upon or in the straw, and no use or aid of beaters or agitators will disengage it or prevent it from being carried off and lost in the straw-pile.

My invention is designed to separate and spread the straw after the grain is partially beaten out of its husk, so that a large part of the grain will be separated and fall upon the carrying grain-draper before the remaining straw and grain reach the second thrashing-cylinder, where a perfect separation of the grain and straw occurs, the former falling through the slatted bars onto the grain-draper and the latter passing off on a distinct carrier of its own, which projects beyond the drop of the grain-draper. This second separation or thrashing is accomplished by the assistance of the middle or feed cylinder interposed between the thrashing-cylinders, substantially as shown in Fig. 1. The middle cylinder (which I call a "self-feeder") takes the straw from the first cylinder and changes its position by raising it half the diameter of the first cylinder and passes it over said self-feeder to the second thrashing-cylinder and its over-concave, which over-concave is arranged so that it may receive additional rows of teeth. In the second thrashing-cylinder and its over-concave any heads of grain imperfectly thrashed by the first cylinder will be thoroughly loosened and the grain let fall at once upon the grain-draper.

A represents the first cylinder; B, the self-feeder; C, the second thrashing-cylinder; D, its over-concave, as herein described. E is the straw-carrier, starting under the shaft of C. F represents the slatted sheet-iron bottom, and G the grain draper or carrier.

The diameter of the self-feeder B is less than that of cylinder A; but its teeth are correspondingly longer, so that it will easily seize the straw as it leaves the first cylinder and lift it and carry it over itself and on to the second thrashing-cylinder, C. The diameter of cylinder C is less than that of the feed-cylinder B, but its teeth are correspondingly longer.

The over-concave D is so arranged that, like the concave to cylinder A, there may be placed in it extra rows of teeth whenever required.

By decreasing the diameter of self-feeder B and cylinder C and increasing the length of their teeth a greater space occurs for the passage of the straw than between the cylinder A and its concave, allowing thereby, notwithstanding their slower motion, cylinders B and C to easily handle (and without clogging) all the straw which comes from cylinder A.

I claim that inasmuch as the greatest resistance of the straw occurs on the passage through cylinder A and its concave, the extra power required to move cylinders B and C will be inappreciable.

The grain draper or carrier extends beneath the three cylinders, passing around a roller or drum, H, at the front, where it changes direction by the aid of guide-rollers I, and is thence inclined upward in the usual manner for these carrying-belts. The independent draper or straw-carrier is already sufficiently described.

The unthrashed straw is fed to the cylinder

A by hand, or by any of the forms of mechanical feeder which are in common use, the machine not differing in this first portion of its construction from the ordinary thrashing-machines.

My invention is a grain-saving appliance, preventing the loss of any grain in the operation of thrashing.

Having thus described my invention, which I claim as new, what I desire to secure by Letters Patent is—

The combination of the undershot thrashing-cylinder, the perforated bottom formed with the step or recess, the overfeed-cylinder arranged in said recess or step, and the final overshot thrashing-cylinder, substantially as and for the purpose set forth.

CHARLES A. JENKINS.

Witnesses:
GEO. CADWALADER,
ROBT. T. DEVLIN.